United States Patent (10) Patent No.: US 11,864,005 B1
Balakrishna et al. (45) Date of Patent: Jan. 2, 2024

(54) OPTIMIZED CARRIER COMBINATION SELECTION

(71) Applicant: T-Mobile Innovations LLC, Overland Park, KS (US)

(72) Inventors: Reman Pezhumkad Balakrishna, Nutley, NJ (US); Zaid Owies, Snoqualmie, WA (US); Alejandro Aguirre, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 274 days.

(21) Appl. No.: 17/386,033

(22) Filed: Jul. 27, 2021

(51) Int. Cl.
*H04W 48/18* (2009.01)
*H04W 24/02* (2009.01)
*H04W 8/24* (2009.01)
*H04W 88/06* (2009.01)
*H04W 92/18* (2009.01)

(52) U.S. Cl.
CPC ............ *H04W 24/02* (2013.01); *H04W 8/24* (2013.01); *H04W 48/18* (2013.01); *H04W 88/06* (2013.01); *H04W 92/18* (2013.01)

(58) Field of Classification Search
CPC ....... H04W 24/02; H04W 8/24; H04W 48/18; H04W 88/06; H04W 92/18
See application file for complete search history.

(56) References Cited

U.S. PATENT DOCUMENTS

| 9,497,639 | B2* | 11/2016 | Meshkati | H04W 36/00837 |
| 9,516,627 | B2 | 12/2016 | Rosa et al. | |
| 10,652,890 | B1* | 5/2020 | Oroskar | H04L 5/0062 |
| 10,938,497 | B2* | 3/2021 | Parkvall | H04L 5/1469 |
| 11,057,962 | B2* | 7/2021 | Iskander | H04W 76/27 |
| 11,109,271 | B1* | 8/2021 | Oroskar | H04L 5/0098 |
| 11,595,969 | B1* | 2/2023 | Marupaduga | H04W 76/16 |
| 2017/0238316 | A1* | 8/2017 | Li | H04W 72/0453 370/329 |
| 2019/0342890 | A1* | 11/2019 | Tong | H04W 76/27 |
| 2020/0245160 | A1* | 7/2020 | Chu | H04L 43/12 |
| 2021/0250800 | A1* | 8/2021 | Meredith | H04W 28/0226 |
| 2021/0409976 | A1* | 12/2021 | Ergen | H04W 72/541 |
| 2022/0174518 | A1* | 6/2022 | Kerl | H04L 43/0888 |
| 2022/0278793 | A1* | 9/2022 | Tsui | H04L 43/0852 |
| 2023/0143729 | A1* | 5/2023 | Zohoorian | H04W 4/029 455/432.1 |
| 2023/0171815 | A1* | 6/2023 | Xue | H04W 72/56 370/329 |

FOREIGN PATENT DOCUMENTS

WO 2018227452 A1 12/2018

* cited by examiner

Primary Examiner — Julio R Perez
(74) Attorney, Agent, or Firm — Jones Robb, PLLC

(57) ABSTRACT

A system for selecting an optimized carrier combination includes primary and secondary access nodes configured to deploy a plurality of carriers, and configured to generate a list of preferred carrier combinations and to re-order one or more internal lists of carrier combinations based on the preferred combinations to enable determination of an optimized carrier combination, for 5G EN-DC, MR-DC, carrier aggregation, and MIMO operation.

20 Claims, 8 Drawing Sheets

OPTIMIZED CARRIER COMBINATION SELECTION

TECHNICAL BACKGROUND

As wireless networks evolve and grow, there are ongoing challenges in communicating data across different types of networks. As wireless technology continues to improve, various radiofrequency carriers (or "carriers") utilizing different radio access technologies (RATs) may be deployed within a wireless network or coverage area thereof. Heterogeneous wireless networks can be configured to deploy newer 5G and millimeter wave (mmWave) carriers, as well as older legacy carriers (e.g. 4G). The rollout of 5G new radio (NR), in terms of services, subscriptions and availability of 5G-capable devices, is outpacing that of 4G Long-Term Evolution (LTE). In addition, the momentum behind 5G NR is expected to continue to be strong in the coming years, with a forecast of 5G subscriptions reaching 3.5 billion in 2026.

For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-Wave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or distributed or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, in an effort to boost coverage and enhance throughput in wireless networks, technologies such as multiple-input multiple-output (MIMO) have been developed. With the evolution of 5G, mmWave, and sub-6G, increasing numbers of antennae can be used to form beams or perform MIMO operating modes, including single-user (SU-MIMO) and/or a multi-user (MU-MIMO) mode. In a recent evolution of MIMO technology, known as massive MIMO or large-scale MIMO, an access node may utilize hundreds of antennae to simultaneously transmit each of a plurality of different data streams to a corresponding plurality of wireless devices. Since MIMO utilizes orthogonal transmission layers to transmit multiple streams to wireless devices, massive MIMO is able to leverage the hundreds of antennae to transmit many streams across many orthogonal layers. As wireless device technology improves, increasing numbers of wireless devices are using higher transmit powers to transmit uplink data. For example, uplink MU-MIMO is a new service that applies MIMO technology to transmitting uplink data using a plurality of layers or streams.

There can be issues related to uplink performance, caused by various factors including a type of transmission being used, a distance of a wireless device from a serving access node (such as a eNodeB, gNodeB, etc.), frequencies being used for uplink transmission, and so on. These issues can be compounded by using MIMO in heterogeneous networks, such as those wireless networks containing access nodes having different capabilities, such as EN-DC, particularly as new and/or different frequency bands are assigned to sectors in the wireless network.

For example, multi-rat dual connectivity (MR-DC) band combination (BC) coordination is performed in primary and secondary access nodes for dual-connectivity (DC) configuration. Wireless devices transmit all the allowed MR-DC BCs that they are capable of as part of the UE capability enquiry procedure. Upon the secondary node addition for dual connectivity, the primary access node signals a list of allowed MR-DC BCs to the secondary access node in an allowedBC-ListMRDC message. The secondary access node selects an MR-DC BC from the list and signals it back to the primary access node. When the primary access node M-NG-RAN signals MR-DC BCs that have the secondary access node PSCell band and the primary access node carrier aggregation (CA) parts given by the primary access node's secondary cell selection algorithms aiming to maximize the number of MIMO layers and component carriers (CCs), the secondary access node selects the BC maximizing MIMO layers of the secondary access node CA parts. However, this existing system limits the secondary access node to select the BC maximizing the MIMO layers and CA of secondary carriers, without being aware of the primary access node's CA parts. As a result, the selected MR-DC combination may not provide an optimized aggregated bandwidth, and thus sub-optimal user throughput.

Overview

Examples described herein include systems and methods for optimized carrier combination selection in dual connectivity networks. In one example, a method for selecting an optimized carrier combination includes generating a list of preferred carrier combinations comprising combinations of carriers from among first and second pluralities of wireless carriers deployed by primary and secondary access nodes respectively, and instructing one or more of the primary access node, the secondary access node, or a wireless device to re-order one or more internal lists of carrier combinations based on the list of preferred combinations to enable determination of an optimized carrier combination.

In another example, a method for selecting an optimized carrier combination includes transmitting a list of preferred carrier combinations to one or more of a primary access node, a secondary access node, or a wireless device communicatively coupled to one or more of the primary or secondary access nodes, the list of preferred carrier combinations comprising combinations of carriers deployed by each of the primary and secondary access nodes, and instructing the primary access node to select the optimized carrier combination based on one or more reordered internal lists of carrier combinations provided by one or both of the wireless device or the secondary access node, the reordered internal lists being based on the list of preferred combinations These operations described herein may be performed by a processing node within a system, such as a telecommunication system. In one example, a system for selecting an optimized carrier combination includes a primary access node configured to deploy a first plurality of wireless carriers, a secondary access node communicatively coupled to the first access node and configured to deploy a second plurality of wireless carriers, and a processing node communicably coupled to both first and second access nodes. The processing node can be configured to perform operations including any of the operations described herein in any combination.

In one example, a processing node can be configured to perform operations including generating a list of preferred carrier combinations comprising combinations of carriers from among the first and second pluralities of wireless carriers, and instructing one or more of the primary access node, the secondary access node, or a wireless device to re-order one or more internal lists of carrier combinations based on the list of preferred combinations to enable determination of an optimized carrier combination.

In another example, a processing node can be configured to perform operations including transmitting a list of preferred carrier combinations to one or more of a primary access node, a secondary access node, or a wireless device communicatively coupled to one or more of the primary or secondary access nodes, the list of preferred carrier combinations comprising combinations of carriers deployed by each of the primary and secondary access nodes, and instructing the primary access node to select the optimized carrier combination based on one or more reordered internal lists of carrier combinations provided by one or both of the wireless device or the secondary access node, the reordered internal lists being based on the list of preferred combinations.

DETAILED DESCRIPTION

Figure 1:
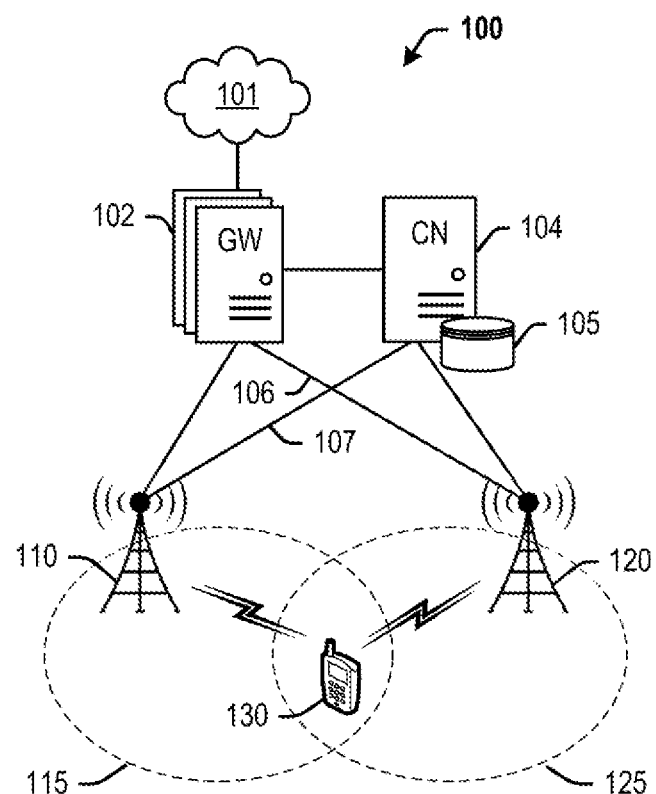
FIG. 1 depicts an example system for optimized selection of carrier combinations.

The following disclosure provides methods and systems for improving the preparation of an allowed Band Combination (BC) list in certain situations where a combination of carriers is used to provide service to a wireless device, such as dual-connectivity, carrier aggregation, and MIMO, and in particular when initiating such services from one or more access nodes including primary and secondary access nodes (e.g. a secondary node addition procedure). A preferred BC list is generated from a plurality of inputs, and shared with different network elements, including primary and secondary access nodes, as well as wireless devices (UEs). Each different network element can also store an internal BC list, and therefore can be instructed to re-order its internal BC list to include carrier combinations (i.e. band combinations or BCs) from the preferred BC list. Since the preferred BC list contains BCs ranked in order of a total predicted throughput, e.g. through negotiation of optimal BCs influenced by the preferred BC list, resultant selected combinations provide a higher overall aggregate bandwidth and/or throughput, thus improving service quality and customer experience.

In one example, the preferred BC list is shared with a primary access node in a dual-connectivity system, enabling the primary access node to re-order an internal list of preferred combinations such that preferred combinations are positioned at the top of the list (i.e., having a lower index value). The preferred BCs with lower index value can include operator preference, as well as performance information of each band or carrier in the wireless network, device capabilities of UEs, etc. The primary access node can share its re-ordered BC list with one or more secondary access nodes to influence negotiation of a selected combination (or selection of an optimal BC). For example, a next-generation radio access network (M-NG-RAN) access node can present an allowedBC-ListMRDC to influence the secondary access node (e.g. S-NG-RAN) to pick the MR-DC BC that can improve user experience. In another example, the preferred BC list is shared with a secondary access node in a dual-connectivity system, enabling the secondary access node to re-order an internal list of preferred combinations such that preferred combinations are positioned at the top of the list (i.e., having a lower index value). For instance, the secondary access node can prioritize and select carrier combinations with a pre-defined ARFCN of M-NGRAN, which is then presented back to the primary access node to influence the selection of an optimal carrier combination. In another example, the preferred BC list is shared with a wireless device, which is then instructed to re-order its internal list (e.g. featureSetCombinations under generalParametersMRDC) and present its list to one or more of the primary or secondary access nodes (e.g. via a RRC UE Capability message in M-NGRAN), Thus the wireless device can influence, via device capabilities, an allowedBC-ListMRDC. In each of these examples, the wireless device is presented with one or more carrier combinations optimized for greatest bandwidth and/or throughput. Operations such as prioritizing, deprioritizing, removal of carrier combinations, and so on can be performed at a wireless device/UE responsive to instructions received thereat, or by a primary or secondary access node, and may be based on one or more of calculated aggregated bandwidths and MIMO layers, performance impact from historical key performance indicators (KPIs) measured from the network, or arbitrarily by operator preference. Further, certain types of UEs (based on specific make/model/chipset) can be selectively instructed to prioritize, deprioritize, and remove carrier combinations based on these factors.

Exemplary heterogeneous dual-connectivity wireless networks described herein include access nodes that are capable of communicating using a plurality of wireless air interfaces or RATs. For example, an access node can include a combination of a 4G eNodeB and a 5G gNodeB. In other words, the access node can be configured to communicate using 4G LTE as well using 5G NR. In some examples, the access node can include a 4G eNodeB coupled to a plurality of 5G gNodeBs (one-to-many or distributed configuration). In similar examples, the access nodes can be selected from either the eNodeB or one of the 5G gNodeBs. As further described herein, the access nodes can be part of the same or different cell sites or radio access networks (RANs), each RAN being served by a different cell site router. Thus, the carrier combinations (or BCs) described herein can utilize two or more RATs, such that the selection of an optimal carrier combination can be one or more BCs that provide a highest aggregate bandwidth. Different RAN configurations for EN-DC capable access nodes are described, with each RAN configuration enabling participation in dual-connectivity using at least two RATs. For example, each access node can include a primary access node configured to deploy carriers utilizing a first RAT, and the primary access node is coupled to one or more secondary access nodes, each secondary access node configured to deploy carriers utilizing a second RAT. Alternatively, each access node comprises a secondary access node configured to deploy carriers utilizing the second RAT, the secondary access node being coupled to a primary access node configured to deploy carriers utilizing the first RAT.

Therefore, a system as described herein for selecting an optimized carrier combination includes a primary access node configured to deploy a first plurality of wireless carriers, a secondary access node communicatively coupled to the first access node and configured to deploy a second plurality of wireless carriers, and a processing node communicably coupled to both first and second access nodes, as further described below. In one example, the processing node is configured to perform operations including generating a list of preferred carrier combinations comprising combinations of carriers from among the first and second pluralities of wireless carriers, and instructing one or more of the primary access node, the secondary access node, or a wireless device to re-order one or more internal lists of carrier combinations based on the list of preferred combinations to enable determination of an optimized carrier combination. The list of preferred carrier combinations is prioritized based on an aggregated bandwidth for each preferred carrier combination, and the optimized carrier combination can include a carrier combination providing a highest-possible bandwidth. In other words, the preferred carrier combinations (and influenced internal BC lists) can be ranked in order of bandwidth, or any other preference based on inputs.

The primary access node and the secondary access node negotiate to select the optimized carrier combination from the one or more internal lists of carrier combinations. For example, the list of preferred carrier combinations can be transmitted to the primary access node, and the primary access node instructed to re-order a first internal list of carrier combinations based on the list of preferred combinations, and transmit the first internal list to the secondary access node. The secondary access node is configured to select one or more preferred secondary carrier combinations based on the first internal list received from the primary access node, and indicate the one or more preferred secondary carrier combinations to the primary access node. The primary access node can select an optimized carrier combination based on the first internal list and the one or more preferred secondary carrier combinations. In another example, the list of preferred carrier combinations is transmitted to the secondary access node, wherein the secondary access node is configured to reorder an internal list of preferred secondary carrier combinations based on the list of preferred carrier combinations, and transmit the list of preferred secondary carrier combinations to the primary access node. The primary access node selects an optimized carrier combination based on the list of preferred secondary carrier combinations and an internal list of primary carrier combinations. In another example, the list of preferred carrier combinations is transmitted to the wireless device, the wireless device is instructed to reorder its internal list of preferred carrier combinations and transmit the internal list to the primary access node.

These and other examples are further described herein and with reference to FIGS. 1-8.

FIG. 1 depicts a system 100 comprising a communication network 101, gateway 102, controller node 104, access node 110, 120, and wireless device 130. In this example, each of access nodes 110, 120 may be configured to deploy at least two wireless air interfaces, including 4G LTE and 5G NR. Each wireless air interface may be configured to utilize a different frequency band or sub-band, a different channel size or bandwidth, and so on. Further, each access node 110, 120 can be configured to deploy at least two wireless air interfaces using dual connectivity. For example, each access node 110, 120 can include a combination of an eNodeB and a gNodeB, such that each access node is configured to deploy a wireless air interface using a first RAT (e.g. 4G LTE) and a second RAT (e.g. 5G NR). Further, each access node 110, 120 can be configured to communicate using both RATs at the same time. For example, dual connections can be set up with wireless device 130 using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. It should be noted that the subject disclosure is not limited to EN-DC configurations. For example, each access node 110, 120 can include a standalone 5G access node configured to deploy multiple 5G wireless air interfaces (e.g. MR-DC). Further, each of access nodes 110, 120 can be configured to perform carrier aggregation. For example, in an EN-DC system, a gNodeB portion of each access node 110, 120 can be configured to aggregate two or more 5G NR carriers, to which a 5G NR transceiver in wireless device 130 can attach or connect. Other implementations may be evident to those having ordinary skill in the art in light of this disclosure. Moreover, each access node 110, 120 can be configured to provide MIMO, e.g. SU-MIMO or MU-MIMO, enabling wireless device 130 to connect to different combinations of aggregated carriers, using dual connectivity, and to orthogonal combinations of MIMO carriers, in any combination. Further, while access nodes 110, 120 and wireless device 130 are illustrated in FIG. 1, system 100 can include various other combinations of carriers/wireless air interfaces, antenna elements, access nodes, and wireless devices, as may be evident to those having ordinary skill in the art in light of this disclosure.

In an example, system 100 is further is configured to perform operations for generating a preferred list of band class (BC) or carrier combinations from a plurality of inputs, and share the preferred list with different network elements in system 100, including primary access node 110, secondary access node 120, as well as wireless devices 130. For the purposes of this disclosure, the terms "carrier combination" and "band combination/BC" are equivalent, with distinctions being made between a preferred BC list, and internal BC lists (or "internal preferred BC lists") associated with each network element. Further, each network element can also store an internal BC list, and therefore can be instructed to re-order its internal BC list to include carrier combinations (i.e. band combinations or BCs) from the preferred BC list. Since the preferred BC list contains BCs ranked in order of a total predicted throughput, e.g. through negotiation of optimal BCs influenced by the preferred BC list, resultant selected combinations provide a higher overall aggregate bandwidth and/or throughput, thus improving service quality and customer experience.

Thus, an example method performed by system 100 can include generating a list of preferred carrier combinations comprising combinations of carriers from among pluralities of wireless carriers deployed by access nodes 110, 120, and instructing one or more of the primary access node 110, the secondary access node 120, or a wireless device 130 to re-order one or more internal lists of carrier combinations based on the list of preferred combinations to enable determination of an optimized carrier combination. The list of preferred carrier combinations is prioritized based on an aggregated bandwidth for each preferred carrier combination, and the optimized carrier combination can include a carrier combination providing a highest-possible bandwidth. For example, the primary access node 110 and the secondary access node 120 negotiate to select the optimized carrier combination from the one or more internal lists of carrier combinations. The list of preferred carrier combinations can be transmitted to the primary access node 110, and the primary access node 110 instructed to re-order a first internal list of carrier combinations based on the list of preferred combinations, and transmit the first internal list to the secondary access node 120 (via, for example, an X2 connection not shown herein). The secondary access node 120 is configured to select one or more preferred secondary carrier combinations based on the first internal list received from the primary access node 110, and indicate the one or more preferred secondary carrier combinations to the primary access node 110. Thus, the selection of preferred secondary carrier combinations, which is typically performed by the secondary access node 120 based on bandwidth/throughput information of secondary carrier combinations, is influenced by the re-ordered first internal list received from the primary access node 110. The primary access node 110 can then select an optimized carrier combination based on the first internal list and the one or more preferred secondary carrier combinations.

In another example, the list of preferred carrier combinations is transmitted to the secondary access node 120, wherein the secondary access node 120 is configured to reorder an internal list of preferred secondary carrier combinations based on the list of preferred carrier combinations, and transmit the list of preferred secondary carrier combinations to the primary access node 110. The primary access node 110 selects an optimized carrier combination based on the list of preferred secondary carrier combinations and an internal list of primary carrier combinations. Further negotiations may be performed between access nodes 110, 120. In another example, the list of preferred carrier combinations is transmitted to the wireless device 130, the wireless device 130 is instructed to reorder its internal list of preferred carrier combinations and transmit the internal list to the primary access node 110 or the secondary access node 120. Since the preferred BC list is generated based on input from a network operator of system 100, or a device capabilities message received from wireless device 130, or other inputs such as historical bandwidth data stored in database 105, the resulting selection of an optimized carrier combination provides a highest-possible aggregate bandwidth.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an example, a macro-cell access node can have a coverage area 115, 125 in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be a direct link or might include various equipment, intermediate components, systems, and networks, such as a cell site router, etc. Communication links 106, 107 may comprise many different signals sharing the same link. Communication links 106, 107 may traverse and/or interface with many different reference points, such as n1, n2, n3, n4, n5, n6, n7, etc., as well as s1, s3, s4, s5, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an example, controller node 104 includes a database 105 for storing information related to components of system 100, such as capabilities of access nodes 110, 120, past or current uplink usage requirements capabilities of wireless device 130, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101. Further, the methods, systems, devices, networks, access nodes, and equipment described herein may be implemented with, contain, or be executed by one or more computer systems and/or processing nodes comprising processors configured to perform the operations and methods described herein. The methods described herein may also be stored on a non-transitory computer readable medium. Many of the elements of communication system 100 may be, comprise, or include computer systems and/or processing nodes. This includes, but is not limited to: access nodes 110, 120, gateway(s) 102, controller node 104, and/or network 101.

Figure 2:
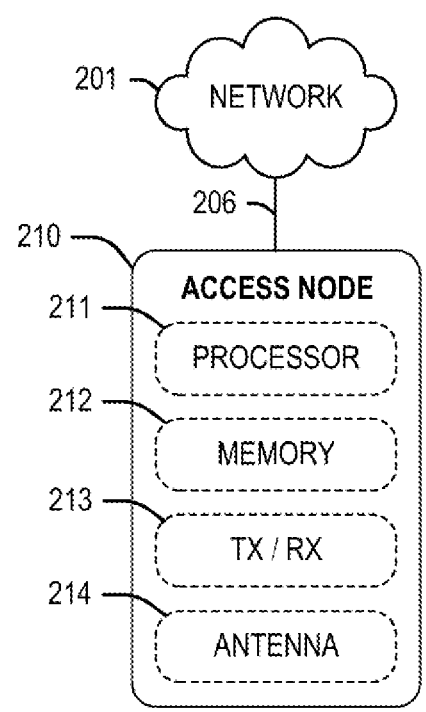
FIG. 2 depicts an access node for optimized selection of carrier combinations.

FIG. 2 depicts an access node 210. Access node 210 may comprise, for example, a macro-cell access node, such as access node 110 described with reference to FIG. 1. Access node 210 is illustrated as comprising a processor 211, memory 212, a transceiver 213, and antennae 214 (hereinafter referred to as antenna elements 214). Processor 211 executes instructions stored on memory 212, and transceiver 213 (in conjunction with antenna elements 214) enable wireless communication respectively at least two wireless air interfaces, such as 4G LTE and 5G NR. For example, access node 210 may be configured to transmit control information using a first set of antennae elements 214 configured to utilize a 4G LTE interface, and data information using a second set of antennae elements 214 configured to utilize a 5G NR air interface. Alternatively or in addition, each separate air interface maintains its own control and data transmissions. In other examples, antennae elements can be configured to deploy different carriers using the same interface, e.g. different 5G carriers in different frequency bands, and with different operating modes. In one example, antenna elements 214 may include an array of antenna elements that are configured to deploy air interfaces over one or more wireless sectors, form beams within these sectors, employ multiple-input-multiple-output (MIMO), etc.

In an example, memory 212 can store instructions for receiving a list of preferred carrier combinations and re-ordering one or more internal lists of carrier combinations based on the list of preferred combinations to enable determination of an optimized carrier combination. The list of preferred carrier combinations can be prioritized based on an aggregated bandwidth for each preferred carrier combination, and the optimized carrier combination selected by access node 210 can therefore include a carrier combination providing a highest-possible bandwidth. The access node can be configured to transmit re-ordered lists and negotiate the selection with one or more secondary access nodes to select the optimized carrier combination from the one or more internal lists of carrier combinations.

Figure 3:
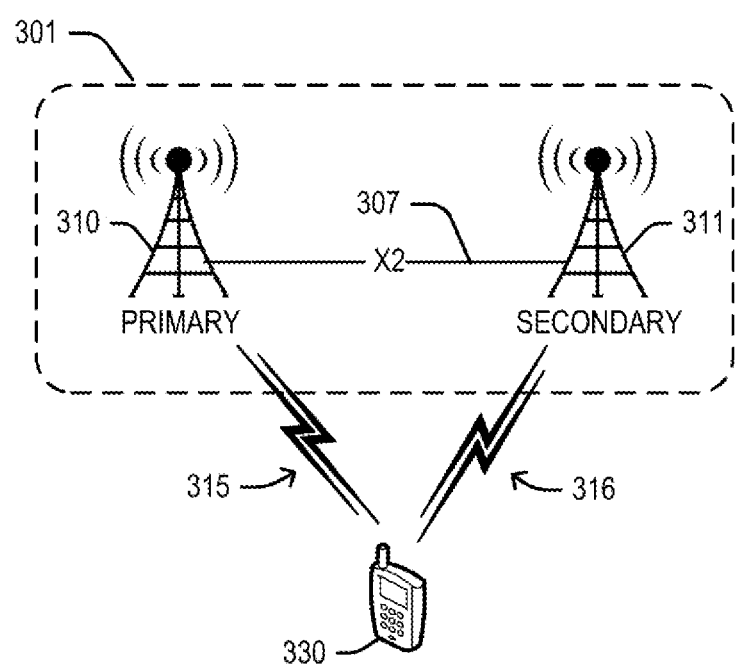
FIG. 3 depicts a collocated access node in a dual-connectivity network.

FIG. 3 depicts a collocated 5G EN-DC radio access network (RAN) 301. RAN 301 includes colocated access nodes 310, 311, and may include other components not shown herein for convenience, such as cell site routers, controllers, etc. Further, RAN 301 may be connected to other intermediate or core networks. In this example, access node 310 is configured as a primary access node (e.g. a eNodeB in an EN-DC system), and access node 311 is configured as a secondary access node (e.g. a gNodeB in the EN-DC system). In one example, access node 310 can be configured to deploy a wireless interface 315 using a first radio access technology (RAT), e.g. 4G LTE, and access node 311 can be configured to deploy a second wireless interface 316 using a second RAT, e.g. 5G NR. Each RAT can be configured to utilize a different frequency band or sub-band, a different channel size or bandwidth, and so on. For example, the 5G NR wireless interface 316 can be configured to utilize higher frequencies and larger channel bandwidths than the 4G LTE wireless air interface 315. Further, each wireless interface 315, 316 can include multiple carriers that can be aggregated for carrier aggregation, and orthogonally paired for MIMO operation.

Further, access nodes 310, 311 can be configured to communicate using both RATs at the same time. For example, dual connections can be set up with any of wireless devices 330 using both 4G and 5G wireless air interfaces 315, 316, the 4G wireless air interface 315 being used to transmit control information, and the 5G wireless air interface 316 being used to transmit data information. For example, a processing node within RAN 301 (for example, communicatively coupled to access nodes 310, 311, or any other network node) can be configured to determine whether or not wireless devices 330 are capable of communicating using both RATs (e.g. capable of 5G EN-DC), and instruct the access node 310 to broadcast an indicator in, for example, a system information message. Responsive to the indicator, wireless devices 330 can connect to access node 310 which can use the 4G carrier to control and set up a dual connectivity session with the wireless devices 330. In other words, control information (including SIB messages) is transmitted from the access node 310 using the 4G LTE wireless air interface, while the 5G NR wireless air interface is utilized for transmission of data via access node 311. In addition, while different carriers offer different channel bandwidths, certain combinations of carriers may provide a greater aggregate channel bandwidth. Such combinations of carriers can be stored in internal band combination (BC) lists in each of access nodes 310, 311. Further, within radio access network 302, access nodes 310 and 311 can be coupled via a direct communication link 307, which can include an X2 communication link. Access nodes 310 and 311 can communicate control and data information across X2 communication link 307. In an example, access node 311 includes logic to determine how to allocate data packets between access node 310 and access node 311, wherein the data packets flow between wireless devices 330 and any external network node. Such logic may include a packet data convergence protocol (PDCP) function. Thus, RAN 301 can include a plurality of antenna elements (not shown herein) coupled to access nodes 310 and 311, with different antenna elements configured to deploy a different radio air interface using a different frequency.

Figure 4:
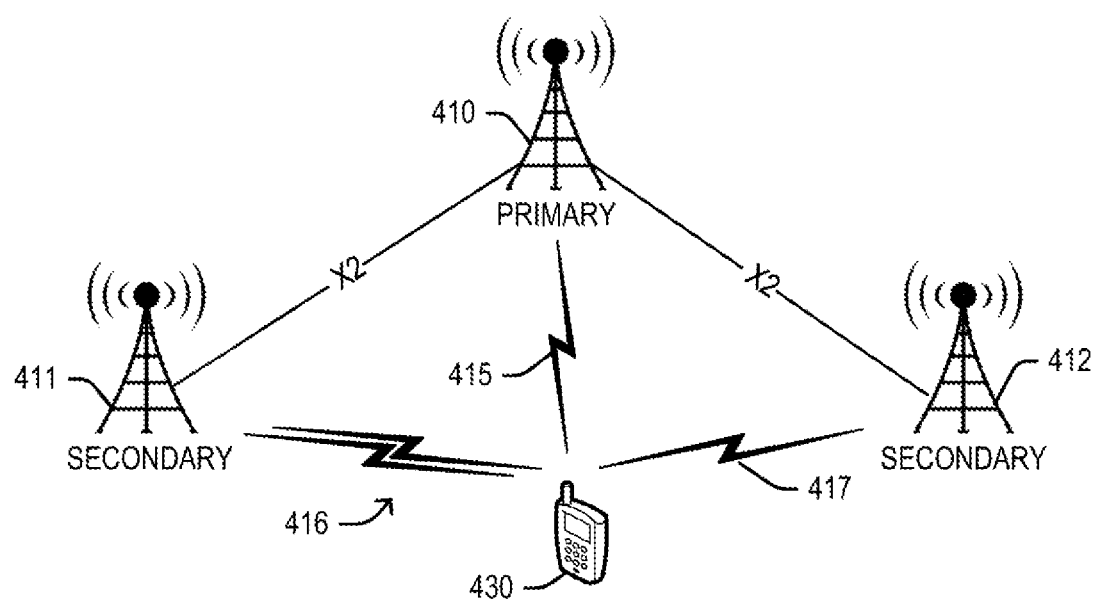
FIG. 4 depicts distributed access nodes in a dual-connectivity network.

FIG. 4 depicts a distributed 5G EN-DC system. This example depicts a one-to-many configuration, in which an eNodeB access node 410 is designated as a primary access node for wireless device 430, and one or more gNodeB access nodes 411, 412 are selected as secondary access nodes, as further described below. Persons having ordinary skill in the art may note that other components may be included in any combination, without materially affecting the scope and spirit of the described examples. In this example, access node 410 can include an eNodeB, and access nodes 411, 412 can include gNodeBs. For example, access node 410 can be configured to deploy a wireless interface 415 using a first radio access technology (RAT), e.g. 4G LTE, and access nodes 411, 412 can be configured to deploy wireless interfaces using a second RAT, e.g. 5G NR. Further, access nodes 410, 411, 412 can be configured to communicate using both RATs at the same time. For example, dual connections can be set up with wireless device 430 using both 4G and 5G air interfaces respectively, the 4G wireless interface 415 being used to transmit control information, and one of the 5G wireless interfaces (e.g. 5G interface 416) being used to transmit data information. For example, a processing node communicatively coupled to access node 410 can be configured to determine whether or not wireless device 430 is capable of communicating using both RATs (e.g. capable of 5G EN-DC), and instruct the access node 410 to broadcast an indicator in, for example, a system information message. Responsive to the indicator, wireless device 430 can connect to access node 410 which can use the 4G carrier to control and set up a dual connectivity session with wireless device 430. Further, access node 410 can be configured to select one (or more) of access nodes 411, 412 as a secondary access node, to transport user data. In other words, control information (including SIB messages) is transmitted from the access node 410 using the 4G LTE air interface, while the 5G NR air interfaces (e.g. 5G NR air interface 416) is utilized for transmission of data. Further, access nodes 411 and 412 (hereinafter "secondary access nodes") can each be coupled to access node 410 (hereinafter "primary access node") via X2 communication links. In an example, each secondary access node 411, 412 can include logic to determine how to allocate data packets between the access nodes, wherein the data packets flow between wireless devices 430 and a network node not shown herein. Such logic may include a packet data convergence protocol (PDCP) function.

The disclosed operations can be performed during a procedure in which secondary access nodes 411, 412 are being selected for a dual-connectivity mode of operation. Despite being illustrated herein as EN-DC, the primary access node 410 can be another gNodeB, or any other RAT, thus capable of MR-DC. Regardless of implementation, a processing node communicatively coupled to one or more of access nodes 410-412 can be configured to generate a list of preferred carrier combinations comprising combinations of carriers from among pluralities of wireless carriers deployed by access nodes 410-412, and instructing one or more of the primary access node 410, the secondary access nodes 411, 412, or a wireless device 430 to re-order one or more internal lists of carrier combinations based on the list of preferred combinations to enable determination of an optimized carrier combination. The list of preferred carrier combinations is prioritized based on an aggregated bandwidth for each preferred carrier combination, and the optimized carrier combination can include a carrier combination providing a highest-possible bandwidth. For example, the primary access node 410 and the secondary access nodes 411, 412 negotiate to select the optimized carrier combination from the one or more internal lists of carrier combinations. The list of preferred carrier combinations can be transmitted to the primary access node 410, and the primary access node 410 instructed to re-order a first internal list of carrier combinations based on the list of preferred combinations, and transmit the first internal list to one or both the secondary access nodes 411, 412 (via, for example, X2 connections). The secondary access nodes 411, 412 are configured to select one or more preferred secondary carrier combinations based on the first internal list received from the primary access node 410, and indicate the one or more preferred secondary carrier combinations to the primary access node 410. Thus, the selection of preferred secondary carrier combinations, which is typically performed by the secondary access node 420 based on bandwidth/throughput information of secondary carrier combinations, is influenced by the re-ordered first internal list received from the primary access node 410. The primary access node 410 can then select an optimized carrier combination based on the first internal list and the one or more preferred secondary carrier combinations.

Figure 5:
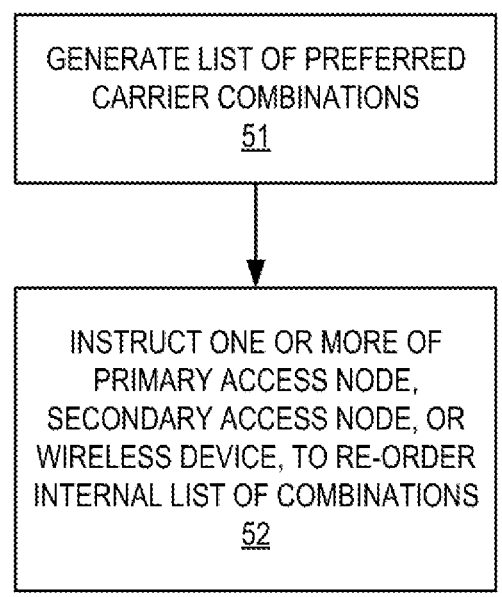
FIG. 5 depicts an example method for optimized selection of carrier combinations.

In another example, the list of preferred carrier combinations is transmitted to the secondary access nodes 411, 412, wherein the secondary access nodes 411, 412 are configured to reorder an internal list of preferred secondary carrier combinations based on the list of preferred carrier combinations, and transmit the list of preferred secondary carrier combinations to the primary access node 410. The primary access node 410 selects an optimized carrier combination based on the list of preferred secondary carrier combinations and an internal list of primary carrier combinations. Further negotiations may be performed between access nodes 410-412. In another example, the list of preferred carrier combinations is transmitted to the wireless device 430, the wireless device 430 is instructed to reorder its internal list of preferred carrier combinations and transmit the internal list to the primary access node 410 or the secondary access nodes 411, 412. Since the preferred BC list is generated based on input from a network operator, or a device capabilities message received from wireless device 430, or other inputs such as historical bandwidth data, the resulting selection of an optimized carrier combination provides a highest-possible aggregate bandwidth FIG. 5 depicts an example method for selectively assigning uplink transmission layers. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 51, a list of preferred carrier combinations is generated. The list of preferred carrier combinations (i.e. preferred BC list) can be generated based on input from a network operator, or a device capabilities message received from a wireless device attempting to attach to one or more access nodes, or other inputs such as historical bandwidth data. The preferred BC list can be prioritized in order of a highest-possible aggregate bandwidth for each combination. Consequently at 52, upon instructing network components to re-order their internal lists of carrier combinations based on the preferred BC list, the resulting selection of an optimized carrier combination provides a highest-possible aggregate bandwidth. For instance, the preferred BC list is shared with a primary access node in a dual-connectivity system, enabling the primary access node to re-order an internal list of preferred combinations such that preferred combinations are positioned at the top of the list (i.e., having a lower index value). The preferred BCs with lower index value can include operator preference, as well as performance information of each band or carrier in the wireless network, device capabilities of UEs, etc. The primary access node can share its re-ordered BC list with one or more secondary access nodes to influence negotiation of a selected combination (or selection of an optimal BC). For example, a next-generation radio access network (M-NG-RAN) access node can present an allowedBC-ListMRDC to influence the secondary access node (e.g. S-NG-RAN) to pick the MR-DC BC that can improve user experience. In another example, the preferred BC list is shared with a secondary access node in a dual-connectivity system, enabling the secondary access node to re-order an internal list of preferred combinations such that preferred combinations are positioned at the top of the list (i.e., having a lower index value). For instance, the secondary access node can prioritize and select carrier combinations with a pre-defined ARFCN of M-NGRAN, which is then presented back to the primary access node to influence the selection of an optimal carrier combination. In another example, the preferred BC list is shared with a wireless device, which is then instructed to re-order its internal list (e.g. featureSetCombinations under generalParametersMRDC) and present its list to one or more of the primary or secondary access nodes (e.g. via a RRC UE Capability message in M-NGRAN), Thus the wireless device can influence, via device capabilities, an allowedBC-ListMRDC. In each of these examples, the wireless device is presented with one or more carrier combinations optimized for greatest bandwidth and/or throughput.

Figure 6:
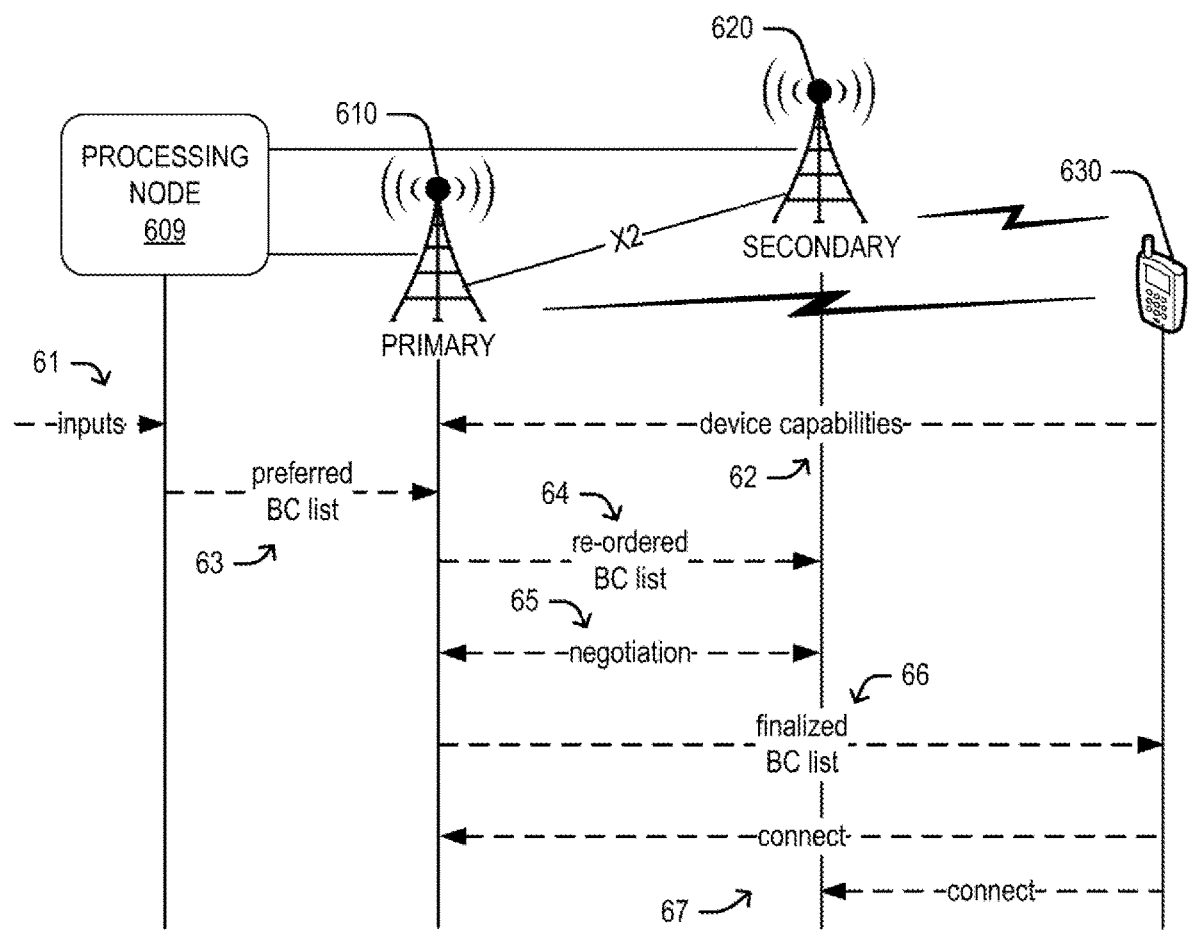
FIG. 6 depicts an example network flow diagram for optimized selection of carrier combinations.

FIG. 6 depicts an example network flow diagram for selection of an optimized carrier combination. The network flow of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the network flow can be omitted, rearranged, combined, and/or adapted in various ways.

At 61, one or more inputs are provided to a processing node 609 to enable the processing node to generate a preferred BC list. Further, wireless device 630 is configured to transmit device capabilities to the network (e.g. to processing node 609 via access node 610), the device capabilities including a list of carriers and/or carrier combinations that the wireless device 630 is allowed to connect or capable of connecting. As described herein, processing node 609 includes at least a memory and a processor, enabling the processing node 609 to determine which carriers provide the highest bandwidth in different combinations. The inputs 61 can include network operator preferences, historic carrier bandwidth trends, performance statistics, and so on. At 63, the processing node transmits the preferred BC list to the access node 610 (hereinafter primary access node 610).

Primary access node 610 attempts to add a secondary access node 620 for a dual-connectivity mode of operation to serve wireless device 630. Therefore, primary access node 610 re-orders an internal list of carrier combinations (i.e. internal BC list) based on the preferred BC list received at 63, and transmits the re-ordered list at 64 to secondary access node 620. The internal BC list identifies combinations of carriers deployed by primary access node 610, and may be arranged in order of a highest-possible bandwidth provided by carrier combinations (e.g. aggregation or MIMO), and is further influenced by the preferred BC list received at 63. Thus, at negotiation 65, the secondary access node 620 can select one or more preferred secondary carrier combinations based on the first internal list received from the primary access node 610 at 65, and indicate the one or more preferred secondary carrier combinations to the primary access node. The primary access node selects an optimized carrier combination based on the first internal list and the one or more preferred secondary carrier combinations, and transmits the finalized BC list at 66 to wireless device 630.

Consequently, wireless device 630 can request to connect at 67 to either or both of primary access node 610 and secondary access node 620. Since the preferred BC list contains BCs ranked in order of a total predicted throughput, e.g. through negotiation of optimal BCs influenced by the preferred BC list, resultant selected combinations provide a higher overall aggregate bandwidth and/or throughput, thus improving service quality and customer experience.

Figure 7:
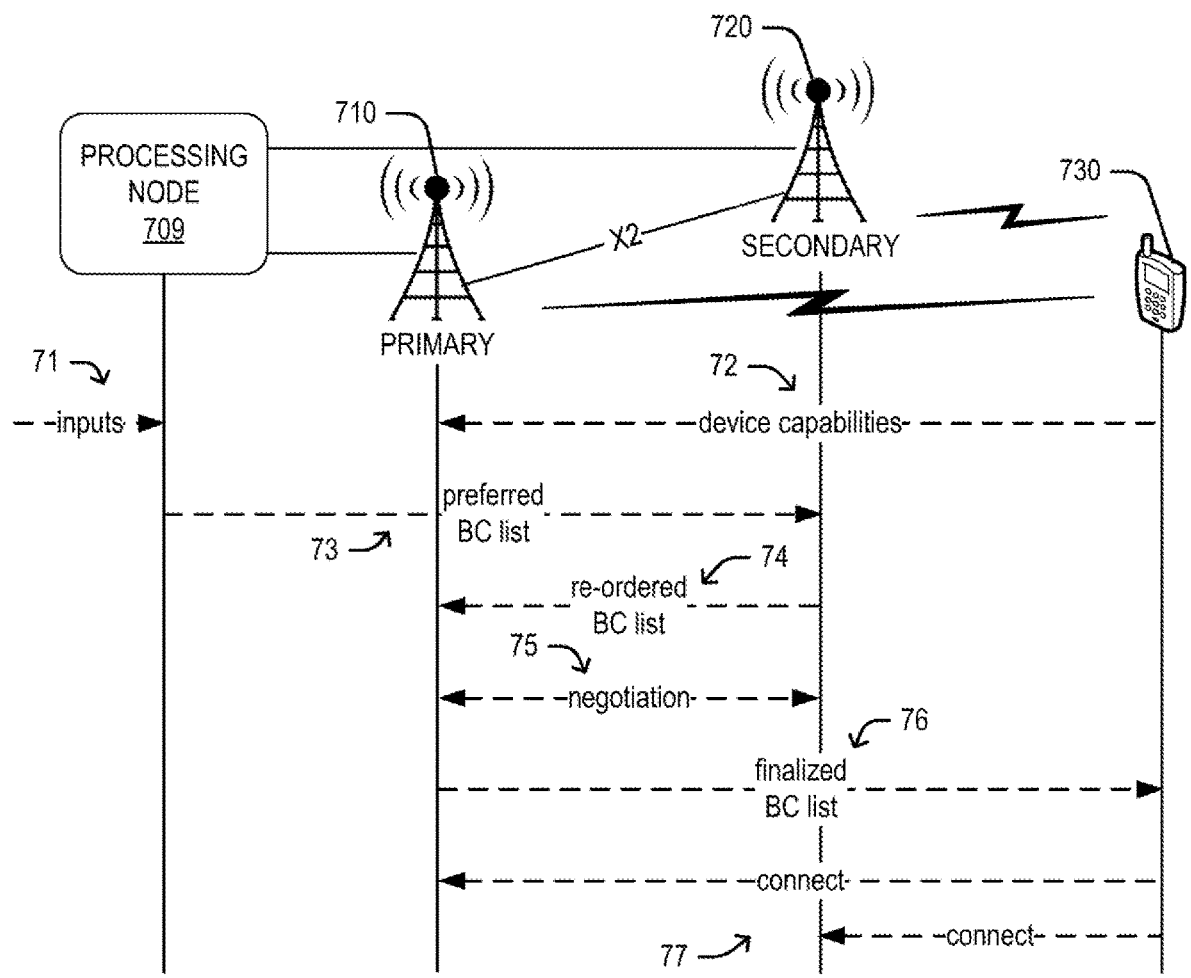
FIG. 7 depicts another example network flow diagram for optimized selection of carrier combinations.

FIG. 7 depicts an example network flow diagram for selection of an optimized carrier combination. The network flow of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the network flow can be omitted, rearranged, combined, and/or adapted in various ways.

At 71, one or more inputs are provided to a processing node 709 to enable the processing node to generate a preferred BC list. Further, wireless device 730 is configured to transmit device capabilities to the network (e.g. to processing node 709 via access node 710), the device capabilities including a list of carriers and/or carrier combinations that the wireless device 730 is allowed to connect or capable of connecting. As described herein, processing node 709 includes at least a memory and a processor, enabling the processing node 709 to determine which carriers provide the highest bandwidth in different combinations. The inputs 71 can include network operator preferences, historic carrier bandwidth trends, performance statistics, and so on. At 73, the processing node transmits the preferred BC list to the access node 720 (hereinafter secondary access node 720).

Primary access node 710 attempts to add a secondary access node 720 for a dual-connectivity mode of operation to serve wireless device 730. Therefore, secondary access node 720 re-orders an internal list of carrier combinations (i.e. internal BC list) based on the preferred BC list received at 73, and transmits the re-ordered list at 74 to primary access node 710. The internal BC list identifies combinations of carriers deployed by secondary access node 710, and may be arranged in order of a highest-possible bandwidth provided by carrier combinations (e.g. aggregation or MIMO), and is further influenced by the preferred BC list received at 73. Thus, at negotiation 75, the primary access node 710 can select one or more preferred carrier combinations based on the internal list received from the secondary access node 720 at 75, and select an optimized carrier combination based on the internal list and the one or more preferred secondary carrier combinations. Primary access node 710 transmits the finalized BC list at 76 to wireless device 730.

Consequently, wireless device 730 can request to connect at 77 to either or both of primary access node 710 and secondary access node 720. Since the preferred BC list contains BCs ranked in order of a total predicted throughput, e.g. through negotiation of optimal BCs influenced by the preferred BC list, resultant selected combinations provide a higher overall aggregate bandwidth and/or throughput, thus improving service quality and customer experience.

Figure 8:
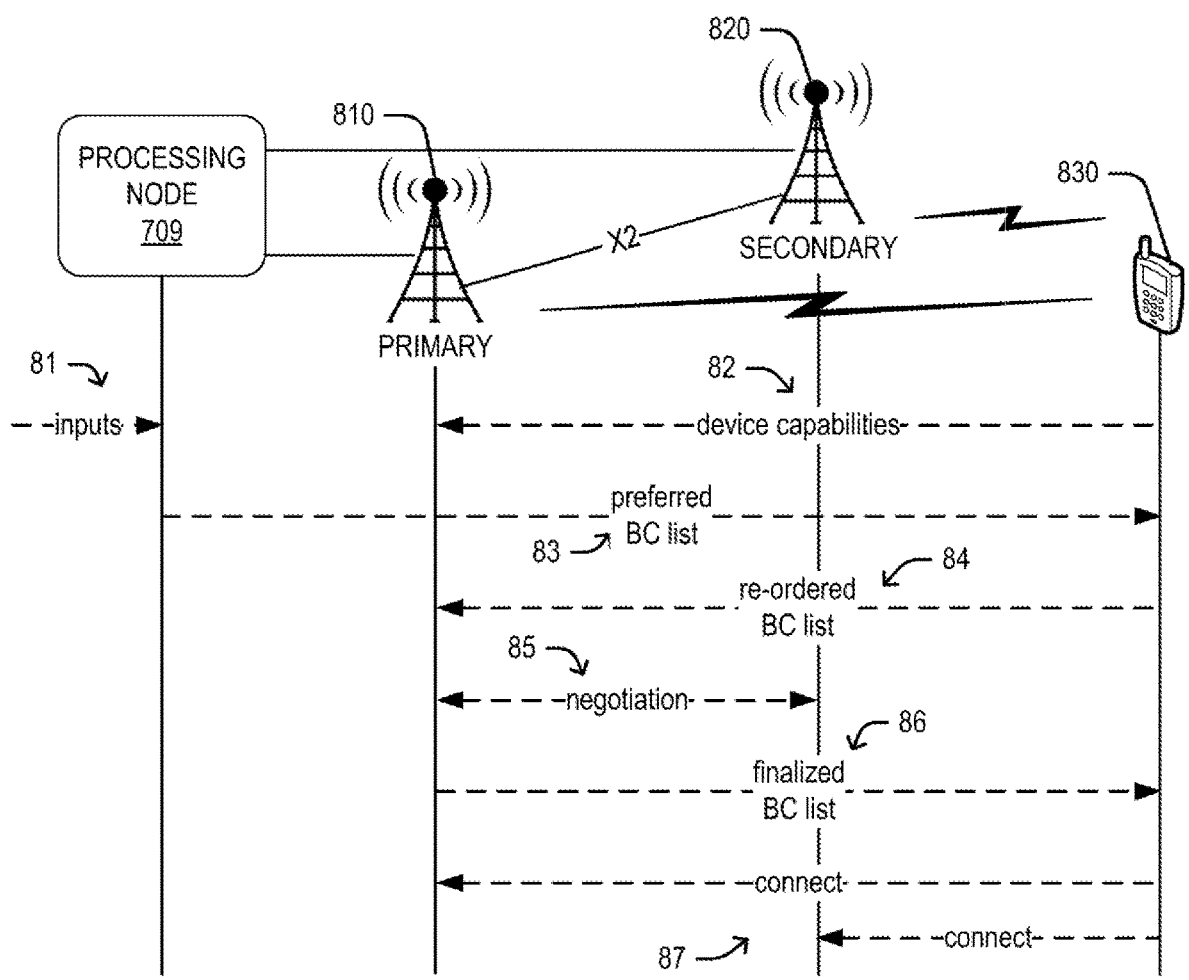
FIG. 8 depicts another example network flow diagram for optimized selection of carrier combinations.

FIG. 8 depicts an example network flow diagram for selection of an optimized carrier combination. The network flow of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the network flow can be omitted, rearranged, combined, and/or adapted in various ways.

At 81, one or more inputs are provided to a processing node 809 to enable the processing node to generate a preferred BC list. Further, wireless device 830 is configured to transmit device capabilities to the network (e.g. to processing node 809 via access node 810), the device capabilities including a list of carriers and/or carrier combinations that the wireless device 830 is allowed to connect or capable of connecting. As described herein, processing node 809 includes at least a memory and a processor, enabling the processing node 809 to determine which carriers provide the highest bandwidth in different combinations. The inputs 81 can include network operator preferences, historic carrier bandwidth trends, performance statistics, and so on. At 83, the processing node transmits the preferred BC list to the wireless device 830.

During a connection procedure of wireless device 830 with primary access node 810, primary access node 810 attempts to add a secondary access node 720 for a dual-connectivity mode of operation to serve wireless device 830. Therefore, wireless device 84 can transmit a re-ordered list of carrier combinations (i.e. allowed MR-DC carrier combinations) influenced by the preferred BC list received at 83, to primary access node 810. Thus, at negotiation 85, the primary access node 810 and secondary access node 820 can select one or more preferred carrier combinations based on the re-ordered list received from the wireless device 830. An optimized carrier combination is selected, and primary access node 810 transmits the finalized BC list at 86 to wireless device 830. Consequently, wireless device 830 can request to connect at 87 to either or both of primary access node 810 and secondary access node 820. Since the preferred BC list contains BCs ranked in order of a total predicted throughput, e.g. through negotiation of optimal BCs influenced by the preferred BC list, resultant selected combinations provide a higher overall aggregate bandwidth and/or throughput, thus improving service quality and customer experience.

While 4G LTE and 5G NR are described in the above examples, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described adjustment of maximum allowable transmit power based on density of access nodes is performed as described herein, the specific implementation and network topology is less relevant.

The systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific examples described above, but only by the following claims and their equivalents.

What is claimed is:

1. A system for selecting an optimized carrier combination, the system comprising:
a primary access node configured to deploy a first plurality of wireless carriers;
a secondary access node communicatively coupled to the primary access node and configured to deploy a second plurality of wireless carriers; and
a processing node communicably coupled to both primary and secondary access nodes, the processing node configured to perform operations comprising:
generating a list of preferred carrier combinations comprising combinations of carriers from among the first and second pluralities of wireless carriers; and
instructing one or more of the primary access node, the secondary access node, or a wireless device to re-order one or more internal lists of carrier combinations based on the list of preferred combinations to enable determination of an optimized carrier combination.

2. The system of claim 1, wherein the list of preferred carrier combinations is prioritized based on an aggregated bandwidth for each preferred carrier combination, and the optimized carrier combination comprises a carrier combination providing a highest-possible bandwidth.

3. The system of claim 1, wherein the primary access node and the secondary access node negotiate to select the optimized carrier combination from the one or more internal lists of carrier combinations.

4. The system of claim 3, wherein the instructions further comprise: transmitting the list of preferred carrier combinations to the primary access node; and instructing the primary access node to: re-order a first internal list of carrier combinations based on the list of preferred combinations, and transmit the first internal list to the secondary access node.

5. The system of claim 4, wherein the secondary access node is configured to select one or more preferred secondary carrier combinations based on the first internal list received from the primary access node, and indicate the one or more preferred secondary carrier combinations to the primary access node.

6. The system of claim 5, wherein the primary access node selects an optimized carrier combination based on the first internal list and the one or more preferred secondary carrier combinations.

7. The system of claim 3, further comprising transmitting the list of preferred carrier combinations to the secondary access node, wherein the secondary access node is configured to reorder an internal list of preferred secondary carrier combinations based on the list of preferred carrier combinations, and transmit the list of preferred secondary carrier combinations to the primary access node.

8. The system of claim 7, wherein the primary access node selects an optimized carrier combination based on the list of preferred secondary carrier combinations and an internal list of primary carrier combinations.

9. The system of claim 1, wherein the operations further comprise transmitting the list of preferred carrier combinations to the wireless device, and instructing the wireless device to reorder its internal list of preferred carrier combinations and transmit the internal list to the primary access node.

10. A method for selecting an optimized carrier combination, the method comprising:
transmitting a list of preferred carrier combinations to one or more of a primary access node, a secondary access node, or a wireless device communicatively coupled to one or more of the primary or secondary access nodes, the list of preferred carrier combinations comprising combinations of carriers deployed by each of the primary and secondary access nodes; and
instructing the primary access node to select the optimized carrier combination based on one or more reordered internal lists of carrier combinations provided by one or both of the wireless device or the secondary access node, the reordered internal lists being based on the list of preferred combinations.

11. The method of claim 10, wherein the list of preferred carrier combinations is prioritized based on an aggregated bandwidth for each preferred carrier combination, and the optimized carrier combination comprises a carrier combination providing a highest-possible bandwidth.

12. The method of claim 10, further comprising transmitting the list of preferred carrier combinations to the primary access node, and instructing the primary access node to re-order a first internal list of carrier combinations based on the list of preferred combinations, and transmit the first internal list to the secondary access node.

13. The method of claim 12, further comprising instructing the secondary access node to reorder a second internal list of secondary carrier combinations based on the first internal list received from the primary access node, and transmit the second internal list to the primary access node.

14. The method of claim 10, further comprising transmitting the list of preferred carrier combinations to the secondary access node, wherein the secondary access node is configured to reorder a first internal list of secondary carrier combinations based on the list of preferred carrier combinations, and transmit the first internal list to the primary access node.

15. The method of claim 10, further comprising transmitting the list of preferred carrier combinations to the wireless device, and instructing the wireless device to reorder its internal list of preferred carrier combinations and transmit the internal list to the primary access node.

16. A processing node for selecting an optimized carrier combination, the processing node comprising a memory and a processor that enable the processing node to perform operations comprising:
   transmitting a list of preferred carrier combinations to one or more of a primary access node, a secondary access node, or a wireless device communicatively coupled to one or more of the primary or secondary access nodes, the list of preferred carrier combinations comprising combinations of carriers deployed by each of the primary and secondary access nodes; and
   instructing the primary access node to select the optimized carrier combination based on one or more reordered internal lists of carrier combinations provided by one or both of the wireless device or the secondary access node, the reordered internal lists being based on the list of preferred combinations.

17. The processing node of claim 16, wherein the list of preferred carrier combinations is prioritized based on an aggregated bandwidth for each preferred carrier combination, and the optimized carrier combination comprises a carrier combination providing a highest-possible bandwidth.

18. The processing node of claim 16, wherein the operations further comprise transmitting the list of preferred carrier combinations to the primary access node, and instructing the primary access node to re-order a first internal list of carrier combinations based on the list of preferred combinations, and transmit the first internal list to the secondary access node.

19. The processing node of claim 18, wherein the operations further comprise instructing the secondary access node to reorder a second internal list of secondary carrier combinations based on the first internal list received from the primary access node, and transmit the second internal list to the primary access node.

20. The processing node of claim 16, wherein the operations further comprise transmitting the list of preferred carrier combinations to the secondary access node, wherein the secondary access node is configured to reorder a first internal list of secondary carrier combinations based on the list of preferred carrier combinations, and transmit the first internal list to the primary access node.

* * * * *